United States Patent [19]
Lee

[11] 3,985,186
[45] Oct. 12, 1976

[54] PLANT GUARD FOR CULTIVATOR

[76] Inventor: Roy A. Lee, Star Route, E. Lee St., Blountsville, Ala. 35031

[22] Filed: Sept. 11, 1975

[21] Appl. No.: 612,563

[52] U.S. Cl. .................................. 172/81; 172/517
[51] Int. Cl.² ..................... A01B 33/16; A01B 39/26
[58] Field of Search .............. 172/517, 508, 514, 81

[56] References Cited
UNITED STATES PATENTS

| | | | |
|---|---|---|---|
| 1,578,886 | 3/1926 | Frazier | 172/517 X |
| 1,655,044 | 1/1928 | Bolens et al. | 172/81 X |
| 2,473,978 | 6/1949 | Van Buskirk | 172/517 X |
| 2,690,342 | 9/1954 | Willey | 172/517 X |
| 3,078,929 | 2/1963 | Kruse | 172/81 X |
| 3,151,431 | 10/1964 | Daugherty | 172/517 X |

Primary Examiner—Paul E. Shapiro
Attorney, Agent, or Firm—Woodford R. Thompson, Jr.

[57] ABSTRACT

A plant guard for a cultivator having cultivator elements mounted on a horizontal rotating shaft. The guard comprises a U-shaped member, as viewed in plan, having a vertical, plate-like base which extends transversely of the direction of travel and is connected to rearwardly extending side members which extend alongside and are pivotally connected to opposite ends of the shaft. Downward movement of the base member is limited with the base member being movable to selected vertical positions.

9 Claims, 5 Drawing Figures

3,985,186

PLANT GUARD FOR CULTIVATOR

BACKGROUND OF THE INVENTION

This invention relates to a plant guard for a cultivator and more particularly to a plant guard for a cultivator having ground engaging cultivator elements which are mounted on a horizontal, rotating shaft.

As is well known in the art to which my invention relates, difficulties have been encountered in cultivating areas between rows of plants due to the fact that the foliage of the plants extends inwardly a sufficient distance to become entangled in the rotating elements of the cultivator whereby damage is not only done to the foliage of the plants but also the cultivator becomes inoperative until the entangled foliage is removed from the rotating cultivator elements.

SUMMARY OF THE INVENTION

In accordance with my invention, I provide a plant guard which is of a generally U-shape, as viewed in plan, and embodies a vertically extending, plate-like base member mounted forwardly of the cultivator elements in position to extend transversely of the direction of travel of the cultivator. Each end of the base member is connected to the forward end of a vertically extending, plate-like side member which extends alongside and is pivotally connected to the adjacent end of the shaft. Preferably, the side members are detachably connected to opposite ends of the rotating shaft whereby the U-shaped plant guard may be installed and removed from the cultivator by merely bending the side members outwardly away from each other and the adjacent ends of the shaft whereby they may be readily attached to or removed from the shaft. Downward movement of the base member below a predetermined elevation is limited whereas the base member is adapted for free upward movement whereby it is movable to selected positions to pass over obstacles in its path of movement. Preferably, the base member is connected to the side members by outwardly and rearwardly extending portions which aid in deflecting the foliage of the plants outwardly away from the approaching cultivator elements.

DESCRIPTION OF THE DRAWINGS

Apparatus embodying features of my invention is illustrated in the accompanying drawings, forming a part of this application, in which.

DETAILED DESCRIPTION

Figure 1:
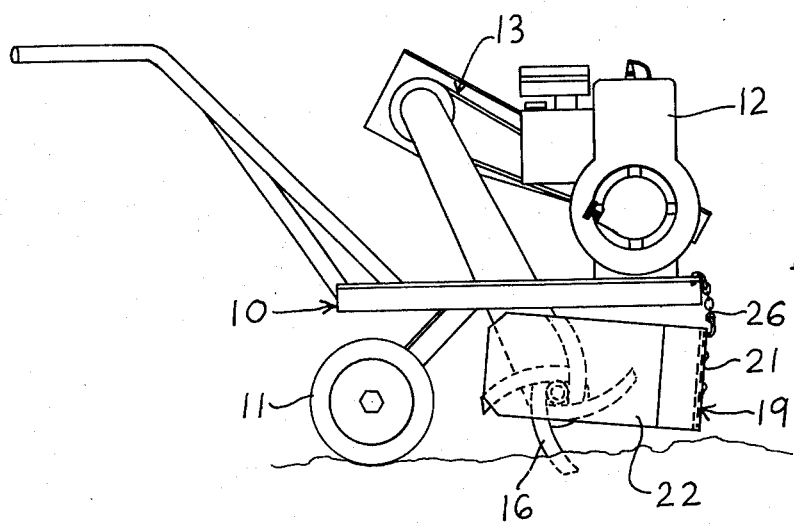
FIG. 1 is a side elevational view showing my improved plant guard mounted on a cultivator.

Referring now to the drawings for a better understanding of my invention, I show a cultivator generally at 10 which may be in the form of a conventional type rotary tiller supported on wheels 11. The tiller is provided with a conventional drive motor 12 which is operatively connected by a suitable drive arrangement 13 to a horizontal, rotating shaft 14. Ground engaging cultivator elements 16 are mounted on the horizontal shaft 14 and rotate therewith in the usual manner. Each end of the rotating shaft 14 may be provided with an outwardly opening, axially extending recess 17, as shown in FIG. 4 or may be provided with an axially extending, threaded recess 18, as shown in FIG. 5.

Figure 2:
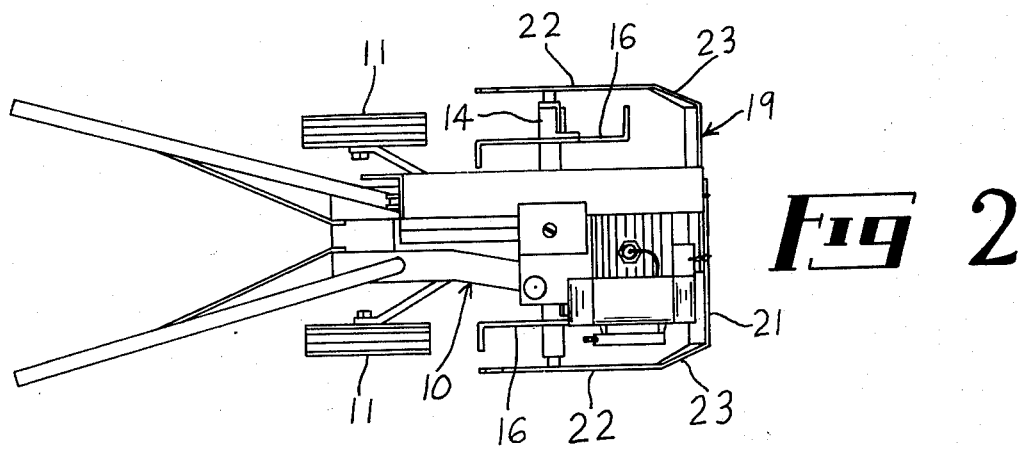
FIG. 2 is a top plan view thereof.
Figure 3:
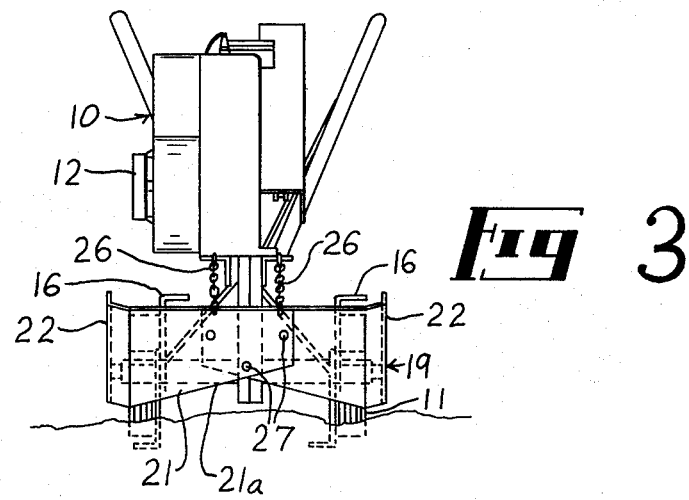
FIG. 3 is a front elevational view thereof.

My improved plant guard comprises a generally U-shaped member 19, as viewed in plan, which is provided with a vertically extending, plate-like base member 21 mounted forwardly of the cultivator elements 16 and extending transversely of the direction of travel of the cultivator with the ends of the base member 21 connected to forward ends of vertically extending, plate-like side members 22. As shown in FIGS. 2 and 3, the side members 22 extend alongside opposite ends of the shaft 14. As clearly shown in FIG. 2, the base member 21 is connected to the side members 22 by outwardly and rearwardly extending portions 23 which aid in deflecting the plant foliage outwardly and away from the approaching rotary cultivator elements 16.

Figure 4:
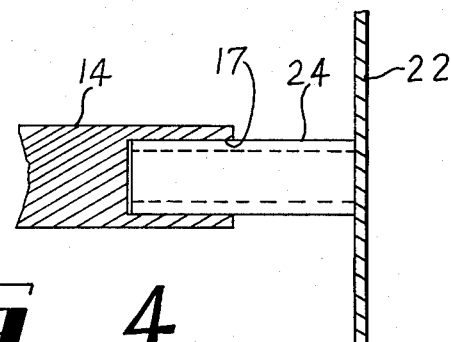
FIG. 4 is an enlarged, fragmental, sectional view showing one type of connection which may be employed between the side members and the adjacent ends of the rotating shaft; and, FIG. 5 is an enlarged, fragmental, sectional view showing another type of connection which may be employed between the sides of the plant guard and the adjacent ends of the rotating shaft.
Figure 5:
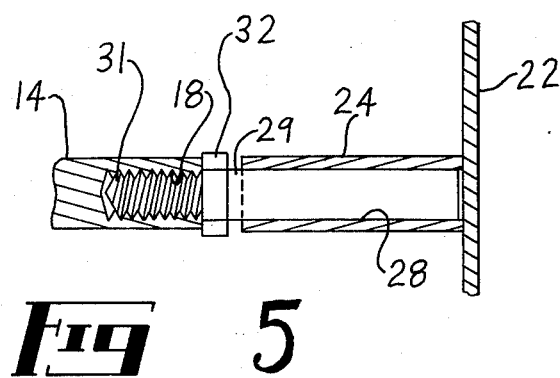

Each side member 22 carries an inwardly extending projection 24 which is adapted to telescope into the axially extending recess 17 provided in the adjacent end of the rotating shaft 14, as shown in FIG. 4. Accordingly, the plant guard may be readily attached to or removed from the cultivator by merely springing the rear ends of the side members 22 outwardly away from each other whereby the inner ends of the inwardly extending projections 24 clear the outer ends of the shaft 14 whereby they are free to move into or be removed from the recesses 17.

To limit downward movement of the base member 21 below a predetermined elevation, flexible members, such as chains 26 are mounted between the base member 21 and an adjacent portion of the cultivator 10, as shown in FIGS. 1 and 3. Suitable openings are provided in the upper portion of the base member 21 for receiving the lower end of the flexible member 26 while a suitable opening is provided in the cultivator frame for receiving the upper end of the flexible member 26. The under surface of the base member 21 is sloped upwardly toward the center thereof as at $21^a$ to facilitate passage of the base member over obstacles in the path of movement of the cultivator. As shown in FIG. 3, the base member 21 may be formed of separate sections which are connected to each other by suitable securing elements 27. However, if desired, the entire U-shaped plant guard may be formed as an integral unit. The plant guard may be formed of a suitable material, such as steel, so that the side members may be sprung outwardly at the rear.

In FIG. 5 of the drawings, I show a modified form of my invention in which each side member 22 is provided with an inwardly extending tubular projection 24 which has an opening 28 therethrough of a size to receive a projecting member 29. The inner end of the projecting member 29 is provided with threads 31 for threadedly engaging the opening 18 whereby the member 29 is secured thereto. A suitable lock nut 32 also engages the threads 18 for locking the projecting member 29 to the shaft 14, as shown.

From the foregoing description, the operation of my improved plant guard will be readily understood. To mount the guard on the cultivator, the rear ends of the side members 22 are moved outwardly whereby the projections 24 clear the ends of the shaft 14 or the end of the projecting member 29, as the case may be, whereby the projecting member 24 then enters the recess 17 or receives the projecting member 29 to thus pivotally connect the side members 22 to the shaft 14. The elevation of the base member 21 is adjusted by varying the length of the flexible members 26 to thus support the lower end of the base member 21 at a selected elevation above the ground. Accordingly, the base member 21 is free to pivot upwardly relative to the ground to thus pass over obstacles, such as clods of dirt, rocks and the like. Also, by sloping the lower edge of the base member 21 upwardly toward the center thereof, the base member 21 is free to pass over most obstacles witout any vertical movement of the base member 21. The foliage of the plants is directed outwardly away from the rotating cultivator elements 16 by the base member 21 and the outwardly and rearwardly extending portions 23 whereby the foliage is moved outwardly with a minimum of effort and without damage to the foliage. To remove the plant guard from the shaft 14, the rear ends of the side members 22 are moved outwardly away from each other whereby the inwardly extending projections 24 clear the opening 17 or the projecting member 29, as the case may be.

From the foregoing, it will be seen that I have devised an improved plant guard which is extremely simple of construction, economical of manufacture and one which may be readily attached to or removed from a conventional cultivator having ground engaging cultivator elements mounted on a horizontal rotating shaft. Also, by providing means for holding the base member 21 at a predetermined elevation whereby the base member is adapted to move upwardly to pass over obstacles, I provide apparatus which is trouble-free in operation and one in which the plant guard always returns to its operating position after passing over an obstacle. Also, by providing the upwardly sloped under surface 21$^a$ on the base member 21 which slopes toward the center of the base member, I further facilitate the movement of the plant guard over obstacles in the path of movement of the base member 21. Furthermore, the provision of the outwardly and rearwardly extending corner portions for the plant guard cause the plant foliage to be moved out of the path of movement of the rotary cultivator elements as the cultivator passes relative thereto whereupon the foliage is then free to move back to its original position without damage to the foliage.

While I have shown my invention in two forms, it will be obvious to those skilled in the art that it is not so limited, but is susceptible to various other changes and modifications without departing from the spirit thereof.

What I claim is:

1. A cultivator having ground engaging cultivator elements mounted on a horizontal rotating shaft, and a plant guard mounted thereon, said plant guard comprising:
   a. a generally U-shaped member as viewed in plan having a vertically extending, plate-like base member mounted forwardly of said cultivator elements and extending transversely of the direction of travel of said cultivator with the ends of said base member connected to forward ends of vertically extending, plate-like side members which extend alongside opposite ends of said shaft,
   b. means pivotally connecting each said side member to the end of said shaft adjacent thereto with said base member being urged downwardly, and
   c. means limiting downward movement of said base member below a predetermined elevation and permitting free upward movement thereof so that said base member is movable to selected vertical positions to pass over obstacles in its path of movement.

2. A cultivator having a plant guard mounted thereon as defined in claim 1 in which each of said side members carries an inwardly extending projection which is operatively connected to an adjacent end of said shaft.

3. A cultivator having a plant guard mounted thereon as defined in claim 2 in which said inwardly extending projection is of a size to engage a recess in an adjacent end of said shaft.

4. A cultivator having a plant guard mounted thereon as defined in claim 2 in which said inwardly extending projection is a tubular member disposed to receive a projection carried by an adjacent end of said shaft.

5. A cultivator having a plant guard mounted thereon as defined in claim 4 in which said projection carried by an adjacent end of said shaft is detachably connected to said adjacent end of said shaft by a threaded connection.

6. A cultivator having a plant guard mounted thereon as defined in claim 1 in which said means limiting downward movement of said base member comprises at least one flexible member connected to and extending between said base member and said cultivator.

7. A cultivator having a plant guard mounted thereon as defined in claim 1 in which said base member is connected to said side members by an outwardly and rearwardly extending portion.

8. A cultivator having a plant guard mounted thereon as defined in claim 1 in which the center of gravity of said U-shaped member is forwardly of said shaft so that said base member is urged downwardly by gravity.

9. A cultivator having a plant guard mounted thereon as defined in claim 1 in which the under surface of said base member is sloped upwardly toward the center thereof to facilitate passage over obstacles in its path of movement.

* * * * *